United States Patent
Dedecker et al.

(10) Patent No.: US 9,926,403 B2
(45) Date of Patent: Mar. 27, 2018

(54) PROCESS FOR MAKING RIGID POLYURETHANE OR URETHANE-MODIFIED POLYISOCYANURATE FOAMS

(71) Applicant: Huntsman International LLC, The Woodlands, TX (US)

(72) Inventors: Kristof Dedecker, Leefdaal (BE); Luca Binaghi, Arcisate (IT); Mauro Corio, Busto Arsizio (IT)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 27 days.

(21) Appl. No.: 15/112,742

(22) PCT Filed: Jan. 20, 2015

(86) PCT No.: PCT/EP2015/050948
§ 371 (c)(1),
(2) Date: Jul. 20, 2016

(87) PCT Pub. No.: WO2015/110404
PCT Pub. Date: Jul. 30, 2015

(65) Prior Publication Data
US 2016/0376397 A1    Dec. 29, 2016

(30) Foreign Application Priority Data

Jan. 22, 2014  (EP) .................... 14152114

(51) Int. Cl.
| | |
|---|---|
| *C08G 18/48* | (2006.01) |
| *C08J 9/14* | (2006.01) |
| *C08G 18/08* | (2006.01) |
| *C08G 18/50* | (2006.01) |
| *C08G 18/76* | (2006.01) |
| *C08G 18/09* | (2006.01) |
| *C08G 18/16* | (2006.01) |
| *C08G 18/42* | (2006.01) |
| *C08G 18/22* | (2006.01) |
| *C08G 18/20* | (2006.01) |
| *C08G 18/18* | (2006.01) |
| *C08K 5/521* | (2006.01) |
| *C08G 101/00* | (2006.01) |

(52) U.S. Cl.
CPC ....... *C08G 18/4845* (2013.01); *C08G 18/092* (2013.01); *C08G 18/14* (2013.01); *C08G 18/163* (2013.01); *C08G 18/1808* (2013.01); *C08G 18/1816* (2013.01); *C08G 18/2036* (2013.01); *C08G 18/225* (2013.01); *C08G 18/4213* (2013.01); *C08G 18/482* (2013.01); *C08G 18/4816* (2013.01); *C08G 18/5027* (2013.01); *C08G 18/7664* (2013.01); *C08J 9/141* (2013.01); *C08J 9/144* (2013.01); *C08J 9/146* (2013.01); *C08G 2101/005* (2013.01); *C08G 2101/0025* (2013.01); *C08J 2205/10* (2013.01); *C08J 2375/08* (2013.01); *C08K 5/521* (2013.01)

(58) Field of Classification Search
CPC .................. C08G 18/4845; C08J 2375/08
See application file for complete search history.

(56) References Cited

U.S. PATENT DOCUMENTS

| | | | |
|---|---|---|---|
| 4,209,609 A | | 6/1980 | Haas |
| 4,356,274 A | * | 10/1982 | Sandler ............. C07D 285/125 521/114 |
| 4,469,822 A | | 9/1984 | Stolz et al. |
| 4,480,070 A | | 10/1984 | Bosscher et al. |
| 4,562,290 A | | 12/1985 | Korszak et al. |
| 4,699,931 A | * | 10/1987 | Fuzesi ................. C08G 18/003 521/117 |
| 4,904,707 A | | 2/1990 | Lunney |
| 4,970,018 A | | 11/1990 | Lunney |
| 5,030,758 A | | 7/1991 | Dietrich et al. |
| 5,112,876 A | | 5/1992 | Tairaka et al. |
| 5,141,968 A | | 8/1992 | Dietrich et al. |
| 5,223,549 A | | 6/1993 | Wiedermann et al. |
| 5,385,952 A | * | 1/1995 | Fishback ............ C08G 18/3878 521/131 |
| 5,674,917 A | * | 10/1997 | Wilson .................... A61L 15/26 521/109.1 |
| 5,763,682 A | | 6/1998 | Moore |
| 2009/0306238 A1 | | 12/2009 | Dinsch et al. |
| 2013/0274358 A1 | | 10/2013 | Yabuno et al. |

FOREIGN PATENT DOCUMENTS

| | | |
|---|---|---|
| DE | 10 124 333 A | 11/2002 |
| EP | 1 205 501 A | 5/2002 |
| FR | 1 546 139 A | 11/1968 |
| GB | 1 463 003 | 2/1977 |

* cited by examiner

*Primary Examiner* — Melissa A Rioja
(74) *Attorney, Agent, or Firm* — Huntsman International LLC; Robert Diaz

(57) ABSTRACT

Process for preparing rigid polyurethane or urethane-modified polyisocyanurate foams from polyisocyanates and polyfunctional isocyanate-reactive compounds in the presence of blowing agents wherein the polyfunctional isocyanate-reactive compounds comprise a polyether polyol having a hydroxyl number of between 50 and 650 mg KOH/g obtained by reacting a polyfunctional initiator first with ethylene oxide and subsequently with propylene oxide wherein the propoxylation degree is between 0.33 and 2 mole propylene oxide per active hydrogen atom in the initiator and wherein the molar ratio of ethylene oxide to propylene oxide in said polyether polyol is at least 2.

14 Claims, No Drawings

PROCESS FOR MAKING RIGID POLYURETHANE OR URETHANE-MODIFIED POLYISOCYANURATE FOAMS

CROSS-REFERENCE TO RELATED APPLICATIONS

This application is the National Phase of International Application PCT/EP2015/050948 filed Jan. 20, 2015 which designated the U.S. and which claims priority to European App. Serial No. 14152114.6 filed Jan. 22, 2014. The noted applications are incorporated herein by reference.

This invention relates to processes for the preparation of rigid polyurethane or urethane-modified polyisocyanurate foams having improved fire retardancy, to foams prepared thereby and to compositions useful in said processes.

Rigid polyurethane and urethane-modified polyisocyanurate foams are in general prepared by reacting a polyisocyanate with isocyanate-reactive compounds (usually a polyol) in the presence of a blowing agent, surfactants and catalysts.

Typical polyols used in rigid polyurethane or urethane-modified polyisocyanurate foam production contain 2 to 8 reactive hydroxyl groups and have average molecular weights from 200 to 1500. The two key classes of polyols are polyether polyols and polyester polyols.

The manufacture of polyether polyols involves the polyaddition of cyclic ethers to a polyfunctional initiator in the presence of a catalyst.

Two cyclic ethers are used commercially in the manufacture of polyether polyols: ethylene oxide and propylene oxide. Of these, propylene oxide is the most significant.

Ethylene oxide can be used in conjunction with propylene oxide to produce a variety of copolymer polyol structures: as an end-cap (or tip), as a block in the polymer chain, as a 'random co-polymer', formed by polymerising ethylene oxide and propylene oxide together, as a combination of two or more of the above structures.

For reasons of poor compatibility with polyisocyanate and because of their excessive reactivity, it is generally customary not to use in rigid polyurethane or urethane-modified polyisocyanurate foam production polyether polyols based on ethylene oxide. The polyols used in said foams are predominantly polyether polyols based on propylene oxide, since the more controllable system reactivity and better compatibility with polyisocyanate are giving better foam quality and easier foam processing when such polyols are used. For this reason, polyether polyols comprising ethylene oxide—if employed at all—are used as a rule as an internal ethylene oxide block or in a minor amount as a secondary constituent of the polyol component.

Rigid polyurethane and urethane-modified polyisocyanurate foams are mainly used in construction for insulation, such as boards for walls and roofs, preinsulated pipes, spray foam for in-situ application, one-component froth (OCF) as sealants and as prefabricated composite panels. Whilst well-insulated buildings are environmentally better due to energy conservation, improving the fire retardancy of said foams is often required to meet fire safety legislation. The blowing agent in them also affects the fire performance, especially the use of the highly flammable hydrocarbons, such as n-, iso- and cyclo-pentane.

Various methods imparting fire retardancy to the polyurethane or urethane-modified polyisocyanurate foams have been developed.

Flame retardants (e.g. bromine and phosphorous flame retardants) are added to the foam formulation in order to achieve specific fire performance standards. Flame retardants can add significantly to system cost, some of them are environmentally questionable on the long term and they often have a negative effect on physical properties such as compressive strength. Further brominated flame retardants generate smoke which leads to a lower smoke category in a fire test such as SBI. For all of the above reasons, there is the need to reduce the amount of flame retardants, especially brominated flame retardants.

Especially for hydrocarbon blown polyurethane foams fairly high amounts of flame retardants are generally needed (up to 60 wt %).

A potential solution to improve the fire retardancy of rigid polyurethane foams is provided in DE 10124333 by using 15 to 45 wt % based on the polyol component of mainly ethoxylated polyether polyols. But ethoxylated polyether polyols are difficult to handle in insulation foam. They give excessive pressure leading to long demould times, they tend to give foam splits and open cells and their flow characteristics are generally giving difficult processing.

It is also known (see, e.g., U.S. Pat. No. 4,209,609, U.S. Pat. No. 4,562,290, U.S. Pat. No. 4,904,707, U.S. Pat. No. 5,112,876, U.S. Pat. No. 4,469,822) to use, in polyurethane foam production, polyether polyols with high hydroxyl values (in general 400 to 630 mg KOH/g) produced by sequential reaction of tolylene diamine with ethylene oxide and then propylene oxide, propylene oxide being usually the major proportion of alkylene oxide used to prepare the polyether polyol. The advantages include, in particular, reduced viscosity, a low coefficient of thermal conductivity, favorable flame resistance and good toughness.

However in order to obtain the required fire classification still bromine containing fire retardants are needed (see, e.g., U.S. Pat. No. 5,223,549, U.S. Pat. No. 5,030,758, U.S. Pat. No. 5,141,968).

It is an object of the present invention to provide fire rated polyurethane or urethane-modified polyisocyanurate insulation foam with good foam properties and good processing characteristics with a minimum amount of flame retardant.

It is a further object of the present invention to provide rigid polyurethane or urethane-modified polyisocyanurate foam systems with good foam properties and good processing characteristics that pass the DIN 4102 test (providing a B2 pass (<15 cm)) without using bromine containing fire retardants.

According to the present invention the use of ethoxylated polyether polyols with a propylene oxide tip have been identified as offering the best solution to the above identified problems.

Since these propylene oxide tipped ethoxylated polyether polyols have a more suitable reactivity they can much easier be incorporated in an insulation foam formulation and surprisingly they provide similar fire properties as fully ethoxylated polyether polyols.

Further by using these propylene oxide tipped ethoxylated polyether polyols the need for reduced flame retardant use without deterioration of fire properties is satisfied, reducing cost and limiting potential environmental issues concerning some flame retardants.

When used in the preparation of rigid urethane-modified polyisocyanurate foams the use of said propylene oxide tipped ethoxylated polyether polyols provide additional advantages over the use of polyester polyols, particularly aromatic polyester polyols, frequently used as isocyanate-reactive compound in the preparation of rigid urethane-modified polyisocyanurate foams namely improved adhesion and a more consistent composition.

The present invention involves a method for making rigid polyurethane or urethane-modified polyisocyanurate foams from polyisocyanates and polyfunctional isocyanate-reactive compounds in the presence of blowing agents wherein the polyfunctional isocyanate-reactive compounds comprise a polyether polyol having a hydroxyl number of between 50 and 650 mg KOH/g obtained by reacting a polyfunctional initiator first with ethylene oxide and subsequently with propylene oxide such that the propoxylation degree of said polyether polyol is between 0.33 and 2 mole propylene oxide per active hydrogen atom in the initiator and the molar ratio of ethylene oxide to propylene oxide in said polyether polyol is at least 2.

Said polyether polyols are generally obtained by a two-step process: in a first step reacting the polyfunctional initiator with ethylene oxide and in a subsequent step with propylene oxide. In the first step preferably pure ethylene oxide is used but also mixtures of ethylene oxide and a small amount (in general less than 20 wt %, preferably less than 10 wt % of total alkylene oxide used in said first reaction step) of another alkylene oxide such as propylene oxide and/or butylene oxide can be used. In the subsequent step preferably solely propylene oxide is used but equally mixtures of propylene oxide containing a small amount (in general less than 20 wt %, preferably less than 10 wt % of total alkylene oxide used in said second reaction step) of another alkylene oxide such as ethylene oxide and/or butylene oxide can be used.

Alternatively said polyether polyols can also be obtained by reacting the polyfunctional initiator in one step with a mixture of ethylene oxide and propylene oxide. Since ethylene oxide is more reactive than propylene oxide, the ethylene oxide groups will react first with the initiator and once all the ethylene oxide is consumed propylene oxide will react with the ethoxylated initiator.

The propoxylation degree of said propylene oxide tipped ethoxylated polyether polyol is an important feature of the present invention: if it's too high the fire properties will deteriorate, if it's too low the reactivity is not sufficiently altered.

The propoxylation degree is between 0.33 and 2 mole propylene oxide per active hydrogen atom, preferably between 0.66 and 1 mole propylene oxide per active hydrogen atom in the initiator.

The amount of ethylene oxide in said propylene oxide tipped ethoxylated polyether polyol is preferably from 2 to 15 mole of ethylene oxide per active hydrogen atom, more preferably from 2.5 to 8.5 mole per active hydrogen in the initiator.

The molar ratio of ethylene oxide to propylene oxide in the propylene oxide tipped ethoxylated polyether polyol is preferably between 2 and 10, more preferably between 2.5 and 8.5.

In general, the amount of propylene oxide is between 15 and 40 wt % and the amount of ethylene oxide between 60 and 85 wt % based on total alkylene oxide in the polyether polyol for use according to the invention. But there may be embodiments according to the invention outside of these ranges.

The amount of ethylene oxide based on the total polyether polyol for use in the present invention is generally between 60 and 97 wt %, preferably between 65 and 90 wt % and the amount of propylene oxide generally between 3 and 40 wt % and preferably between 10 and 35 wt % based on said total polyether polyol.

Any initiator containing from 2 to 8, preferably 3 to 5 active hydrogen atoms per molecule known in the art can be used to obtain the propylene oxide tipped ethoxylated polyether polyol for use in the present invention. Suitable initiators include: polyols, for example glycerol, trimethylolpropane, triethanolamine, pentaerythritol, sorbitol and sucrose; polyamines, for example ethylene diamine, tolylene diamine (TDA), diaminodiphenylmethane (DADPM) and polymethylene polyphenylene polyamines; and aminoalcohols, for example ethanolamine and diethanolamine; and mixtures of such initiators. A particularly prepared initiator is glycerol or DADPM.

Alkoxylated phenol formaldehyde resins (Novolak) or Mannich based polyether polyols are preferably not used as the propylene oxide tipped ethoxylated polyether polyol in the present invention. And also TDA initiated polyether polyols are not amongst the preferred propylene oxide tipped ethoxylated polyether polyols for use in the present invention.

The propylene oxide tipped ethoxylated polyether polyols for use in the present invention have average hydroxyl numbers of from 50 to 650 mg KOH/g, preferably 100 to 650 mg KOH/g, especially from 120 to 350 mg KOH/g, most preferably between 150 and 300 mg KOH/g. Other preferred ranges for the hydroxyl number are: 50 to 400 mg KOH/g, 75 to 350 mg KOH/g, 100 to 300 mg KOH/g, 150 to 290 mg KOH/g, 160 to 250 mg KOH/g.

A particularly preferred propylene oxide tipped ethoxylated polyether polyols for use in the present invention is a glycerol initiated polyether polyol of hydroxyl value 100 to 300 mg KOH/g having a propoxylation degree of 0.66 to 1 mole of propylene oxide per active hydrogen atom and an ethylene oxide/propylene oxide molar ratio of between 5 and 8.

Another particularly preferred propylene oxide tipped ethoxylated polyether polyols for use in the present invention is a DADPM initiated polyether polyol of hydroxyl value 100 to 300 mg KOH/g having a propoxylation degree of 0.66 to 2 mole of propylene oxide per active hydrogen atom and an ethylene oxide/propylene oxide molar ratio of between 5 and 8.

The propylene oxide tipped ethoxylated polyether polyol for use in the present invention is preferably prepared by first adding ethylene oxide onto the initiator, preferably in an amount of 2 to 15, more preferably 2 to 10 or even 2.5 to 8.5 mole per active hydrogen. After the addition reaction of the ethylene oxide, propylene oxide is added in an amount of 0.33 to 2 mole per active hydrogen, preferably 0.66 to 1 mole per active hydrogen.

In the process of the present invention only one of said propylene oxide tipped ethoxylated polyether polyols can be used or a mixture of two or more of such polyols.

Other isocyanate-reactive compounds to be used in the process of the present invention in addition to the propylene oxide tipped ethoxylated polyether polyol include any of those known in the art for the preparation of rigid polyurethane or urethane-modified polyisocyanurate foams. Of particular importance are polyols and polyol mixtures having average hydroxyl numbers of from 160 to 1000, especially from 200 to 800 mg KOH/g, and hydroxyl functionalities of from 2 to 8, especially from 2 to 6. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose;

polyamines, for example ethylene diamine, tolylene diamine (TDA), diaminodiphenylmethane (DADPM) and polymethylene polyphenylene polyamines; and aminoalcohols, for example ethanolamine and diethanolamine; and mixtures of such initiators. Other suitable polymeric polyols include polyesters obtained by the condensation of appropriate proportions of glycols and higher functionality polyols with dicarboxylic or polycarboxylic acids, DMT-scrap or digestion of PET by glycols. Still further suitable polymeric polyols include hydroxyl-terminated polythioethers, polyamides, polyesteramides, polycarbonates, polyacetals, polyolefins and polysiloxanes.

Preferred isocyanate-reactive compounds to be used in the present invention in addition to the propylene oxide tipped ethoxylated polyether polyol are propoxylated polyethers with a functionality above 5 and an hydroxyl value above 400 mg KOH/g and aromatic polyester polyols with an hydroxyl value below 350 mg KOH/g.

Compounds having at least two hydrogen atoms which are reactive towards isocyanate groups also include any low molecular weight (below 400) chain extenders and cross-linkers which may be concomitantly used. The addition of bifunctional chain extenders, trifunctional and higher-functional crosslinkers or, if appropriate, mixtures thereof can prove to be advantageous for modifying the mechanical properties. As chain extenders and/or crosslinkers, preference is given to alkanolamines and in particular diols and/or triols having molecular weights of less than 400, preferably from 60 to 300.

Examples of such compounds include water, triethanolamine, ethylene glycol, diethylene glycol, trimethylolpropane, formitol mixtures and glycerol.

Preferably said compounds are used in amounts varying between 0 and 10 pbw based on total isocyanate-reactive compounds.

In general, the total polyfunctional isocyanate-reactive component for use in rigid polyurethane foam according to the present invention will have an hydroxyl value between 300 and 550 mg KOH/g and an average functionality between 2.5 and 5.0. In the case of rigid urethane-modified polyisocyanurate foams the polyfunctional isocyanate-reactive component generally has an hydroxyl value between 150 and 350 mg KOH/g and an average functionality between 2 and 3.5.

For use in rigid polyurethane foams said propylene oxide tipped ethoxylated polyether polyol is preferably present in an amount of between 5 and 50 pbw, more preferably between 5 and 35 pbw or even between 10 and 30 pbw or between 15 and 25 pbw of total polyfunctional isocyanate-reactive compounds present in the foam formulation.

When used in rigid urethane-modified polyisocyanurate foam the amount of said propylene oxide tipped ethoxylated polyether polyol is preferably between 20 and 80 pbw and most preferably between 30 and 70 pbw based on total polyfunctional isocyanate-reactive compounds present in the foam formulation.

Suitable organic polyisocyanates for use in the process of the present invention include any of those known in the art for the preparation of rigid polyurethane or urethane-modified polyisocyanurate foams, and in particular the aromatic polyisocyanates such as diphenylmethane diisocyanate in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, toluene diisocyanate in the form of its 2,4- and 2,6-isomers and mixtures thereof, 1,5-naphthalene diisocyanate and 1,4-diisocyanatobenzene. Other organic polyisocyanates, which may be mentioned, include the aliphatic diisocyanates such as isophorone diisocyanate, 1,6-diisocyanatohexane and 4,4'-diisocyanatodicyclohexylmethane.

In order to obtain rigid polyurethane foam the reaction between the polyisocyanate and polyfunctional isocyanate-reactive component is typically carried out at an isocyanate index of up to 240%, preferably at an isocyanate index of up to 180%, most preferably at an isocyanate index of from 100 to 160%. For urethane-modified polyisocyanurate foams said index is higher, preferably between 250 and 1000%, most preferably between 350 and 500%. The term isocyanate index as used herein is meant to be the molar ratio of NCO-groups over reactive hydrogen atoms present in the foam formulation, given as a percentage.

Any of the physical blowing agents known for the production of rigid polyurethane or urethane-modified polyisocyanurate foam can be used in the process of the present invention. Examples of these include dialkyl ethers, cycloalkylene ethers and ketones, fluorinated ethers, chlorofluorocarbons, perfluorinated hydrocarbons, hydrochlorofluorocarbons, hydrofluorocarbons, hydrochlorofluoroolefins, hydrofluoroolefins and, in particular, hydrocarbons.

Examples of suitable hydrochlorofluorocarbons include 1-chloro-1,2-difluoroethane, 1-chloro-2,2-difluoro ethane, 1-chloro-1,1-difluoroethane, 1,1-dichloro-1-fluoroethane and monochlorodifluoromethane.

Examples of suitable hydrofluorocarbons include 1,1,1,2-tetrafluoroethane (HFC 134a), 1,1,2,2-tetrafluoroethane, trifluoromethane, heptafluoropropane, 1,1,1-trifluoroethane, 1,1,2-trifluoro ethane, 1,1,1,2,2-pentafluoropropane, 1,1,1,3-tetrafluoropropane, 1,1,1,3,3-pentafluoropropane (HFC 245fa), 1,1,3,3,3-pentafluoropropane, 1,1,1,3,3-pentafluoro-n-butane (HFC 365mfc), 1,1,1,4,4,4-hexafluoro-n-butane, 1,1,1,2,3,3,3-heptafluoropropane (HFC 227ea) and mixtures of any of the above.

Examples of suitable hydro(chloro)fluoroolefins are trans-1-chloro-3,3,3-fluoropropene (HCFO 1233zd), trans-1,3,3,3-tetrafluoropropene (HFO 1234ze) and 1,1,1,4,4,4-hexafluoro-2-butene (HFO 1336mzz).

Suitable hydrocarbon blowing agents include lower aliphatic or cyclic, linear or branched hydrocarbons such as alkanes, alkenes and cycloalkanes, preferably having from 4 to 8 carbon atoms. Specific examples include n-butane, iso-butane, 2,3-dimethylbutane, cyclobutane, n-pentane, iso-pentane, technical grade pentane mixtures, cyclopentane, methylcyclopentane, neopentane, n-hexane, iso-hexane, n-heptane, iso-heptane, cyclohexane, methylcyclohexane, 1-pentene, 2-methylbutene, 3-methylbutene, 1-hexene and any mixture of the above. Preferred hydrocarbons are n-butane, iso-butane, cyclopentane, n-pentane and isopentane and any mixture thereof.

Other suitable blowing agents are tertiary butanol (2-methyl-2-propanol), formic acid, dimethoxymethane and methyl formiate.

Generally water or other carbon dioxide-evolving compounds are used together with the physical blowing agents. Where water is used as chemical co-blowing agent typical amounts are in the range from 0.2 to 5%, preferably from 0.5 to 3% by weight based on the isocyanate-reactive component.

The total quantity of blowing agent to be used in a reaction system for producing cellular polymeric materials will be readily determined by those skilled in the art, but will typically be from 2 to 25% by weight based on the total polyfunctional isocyanate-reactive components.

Preferred blowing agents are hydrocarbons, hydrofluorocarbons, hydro(chloro)fluoroolefins and any mixture thereof.

The reaction is generally carried out in the presence of a catalyst that catalyses the reaction of isocyanates with water and other isocyanate-reactive compounds such as tertiary amines, organometallic compounds (primarily tin compounds) and carboxylic acid salts.

Examples of suitable urethane catalysts for use in the present invention include dimethylcyclohexylamine, triethylamine, pentamethylenediethylenetriamine, tris (dimethylamino-propyl) hexahydrotriazine (commercially available as Jeffcat TR 90 from Huntsman Performance Chemicals), dimethylbenzylamine (commercially available as Jeffcat BDMA from Huntsman Performance Chemicals), 2,2-dimorpholinodiethylether, bis-(2-dimethylaminoethyl)-ether (commercially available as Niax A1 or Jeffcat ZF20 from Huntsman Performance Chemicals), 1,4-diazobicyclo [2.2.2] octane, N-[2-(dimethylamino)ethyl]-N-methylethanolamine (commercially available as Jeffcat Z110 from Huntsman Performance Chemicals), dimethylethanolamine, 2-(2-dimethylamino-ethoxy)-ethanol (commercially available as Jeffcat ZF10 from Huntsman Performance Chemicals), 1-(bis(3-(dimethylamino)propyl)amino)-2-propanol (commercially available as Jeffcat ZR50 from Huntsman Performance Chemicals), stannous octoate, dibutyltindilaurate, potassium acetate, potassium octoate and any mixture thereof.

The above catalysts are generally used in amounts ranging from 0.5 to 8% by weight based on the isocyanate-reactive component.

When rigid urethane-modified polyisocyanurate foam is to be produced additionally a catalyst is present that catalyses the isocyanate trimerisation reaction. Examples include tertiary amines, triazines and most preferably metal salt catalysts such as alkali metal salts of organic carboxylic acids.

These trimerisation catalysts are generally used in amounts ranging from 0.5 to 5% by weight based on the isocyanate-reactive component.

In addition to the polyisocyanate and polyfunctional isocyanate-reactive compositions and the blowing agents and catalysts, the foam-forming reaction mixture will commonly contain one or more other auxiliaries or additives conventional to formulations for the production of rigid polyurethane or urethane-modified polyisocyanurate foams. Such optional additives include fire retardants, for example phosphorous containing products, surfactants preferably silicone-based surfactants and fillers such as carbon black.

While the basic foam formulation of the present invention enables preparation of foams having improved fire properties, in some embodiments it may be desirable to further enhance fire performance by including, as additives, one or more brominated or preferably non-brominated flame retardants such as tris(2-chloroethyl)phosphate, tris(2-chloropropyl) phosphate, triethyl phosphate, dimethyl-propyl phosphonate, diethyl-ethyl phosphonate, chlorinated paraffins, and any mixture thereof.

When flame retardants are used in the process of the present invention, they are generally added in amounts varying between 10 and 60 pbw, preferably between 15 and 30 pbw based on the isocyanate-reactive component.

Surfactants, including organic surfactants and silicone based surfactants, may be added to serve as cell stabilizers. Some representative materials are sold under the designations Niax L6100, L6900, L6917, L6887 supplied by Momentive Performance Chemicals, Dabco DC 193 supplied by Air Products, Tegostab B8534, B8461, B8490, B8476, B8460, B8486, B8466, B8484, B8470, B8487 supplied by Evonik. Typically, from about 0.5 to 5 pbw of surfactant based on isocyanate-reactive component is used.

The polyurethanes prepared according to the process of this invention are generally rigid, foamed, closed-celled polymers, usually having an open cell content of less than 20%.

The density of the foams produced by the process of the invention is preferably in the range 25 to 50 g/l.

Such a foamed polymer is typically prepared by intimately mixing the reaction components, i.e., a polyol/blowing agent component (consisting essentially of the isocyanate-reactive components and blowing agent(s)), along with an isocyanate component, i.e. at least two streams; or a polyol component (consisting essentially of the isocyanate-reactive compounds), a blowing agent component and an isocyanate component, i.e., at least three streams, wherein the formulated polyol and blowing agent component mix just prior to contact thereof with the isocyanate component, at room temperature or at a slightly elevated temperature for a short period. Additional streams may be included, as desired, for the introduction of various catalysts and other additives. Mixing of streams may be carried out either in a spray apparatus, a mixhead with or without a static mixer for combining the polyol component and blowing agent, or a vessel, and then spraying or otherwise depositing the reacting mixture onto a substrate. This substrate may be, for example, a rigid or flexible facing sheet made of foil or another material, including another layer of similar or dissimilar polyurethane which is being conveyed, continuously or discontinuously, along a production line, or directly onto a conveyor belt.

In alternative embodiments the reacting mixture may be poured into an open mold or distributed via laydown equipment into an open mould or simply deposited at or into a location for which it is desired, i.e., a pour-in-place application, such as between the interior and exterior walls of a structure. In the case of deposition on a facing sheet, a second sheet may be applied on top of the deposited mixture. In other embodiments, the mixture may be injected into a closed mold, with or without vacuum assistance for cavity-filling. If a mold is employed, it is most typically heated.

In general, such applications may be accomplished using the known one-shot, prepolymer or semi-prepolymer techniques used together with conventional mixing methods. The mixture, on reacting, takes the shape of the mold or adheres to the substrate to produce a polyurethane polymer or a more-or-less predefined structure, which is then allowed to cure in place or in the mold, either partially or fully. Optimum cure conditions will depend upon the particular components, including catalysts and quantities used in preparing the polymer and also the size and shape of the article manufactured.

The result may be a rigid foam in the form of slabstock, a molding, a filled cavity, including but not limited to a pipe or insulated wall or hull structure, a sprayed foam, a frothed foam, or a continuously- or discontinuously-manufactured laminate product, including but not limited to a laminate or laminated product formed with other materials such as hardboard, plasterboard, plastics, paper, metal, or a combination thereof.

The polyurethane or urethane-modified polyisocyanurate foams produced according to the present invention exhibit improved fire behavior when compared to foams from formulations and preparation methods that are similar except that the formulations do not comprise the propylene oxide tipped ethoxylated polyether polyol used in the present invention.

As used herein, in general the term "improved fire behavior" refers to the capability of the foam to exhibit B2 fire behavior, which is defined as having a flame height of not higher than 15 cm when tested according to German Standard DIN 4102.

According to DIN 4102, combustible building materials are categorized into B1: schwerentflammbar, B2: normal entflammbar, or B3: leichtentflammbar, using both a small burner test and a large chimney test procedure.

The small burner test consists of a vertically oriented specimen which is exposed on either edge or side to a specified ignition flame for 15 seconds. To obtain a B2 classification, the flame front may not have reached a previously marked line at 150 mm within a 20 second time interval inclusive of the 15 second flame exposure time.

In addition, the polyurethane and urethane-modified polyisocyanurate foams produced according to the invention exhibit improved processing properties, including reduced post expansion at selected foam demould times, increased foam height at string time and reduced foam splits at critical demould times. These features may be particularly advantageous when the invention is employed to produce insulated sandwich panels.

The rigid foams obtainable in accordance with the invention are useful for applications requiring increased flame resistance for polyurethane or urethane-modified polyisocyanurate foams, such as in the building industry. They are also useful as insulation in the automotive field (trucks and automobiles), as coating materials having increased flame resistance and as noise insulator for engine bonnets.

The various aspects of this invention are illustrated, but not limited by the following examples.

In these examples the following ingredients are used:

| | |
|---|---|
| Polyether A | A mixture of a propoxylated polyether polyol based on sorbitol and a propoxylated polyether polyol based on glycerol as initiator and glycerol. OHV 765 mg KOH/g. Viscosity 9200 cps at 25° C. |
| Polyether B | A propoxylated polyether polyol based on sorbitol and mixed with glycerol. OHV 750 mg KOH/g. Viscosity 10300 cps at 25° C. |
| Polyether C | An ethoxylated polyether polyol with propylene oxide tip based on polymeric diaminodiphenylmethane as initiator. A propylene oxide tip (1 mole PO/active H) has been added to the polyether after the ethoxylation was completed. EO/PO molar ratio 5.2; OHV 165 mg KOH/g. Viscosity 1500 cps at 25° C. |
| Polyether D | An ethoxylated polyether polyol based on polymeric diaminodiphenylmethane as initiator. OHV 165 mg KOH/g. Viscosity 1500 cps at 25° C. |
| Polyether E | An ethoxylated polyether polyol based on glycerol as initiator. OHV 290 mg KOH/g. Viscosity 250 cps at 25° C. |
| Polyether F | A propoxylated polyether polyol based on glycerol. OHV 290 mg KOH/g. Viscosity 275 cps at 25° C. |
| Polyether G | An ethoxylated polyether polyol with propylene oxide tip based on glycerol as initiator. A propylene oxide tip (0.66 mole PO/active H) has been added to the polyether after the ethoxylation was completed. EO/PO molar ratio 4; OHV 290 mg KOH/g. Viscosity 250 cps at 25° C. |
| Polyether H | An ethoxylated polyether polyol with propylene oxide tip based on glycerol as initiator. A propylene oxide tip (1.0 mole PO/active H) has been added to the polyether after the ethoxylation was completed. EO/PO molar ratio 2.3; OHV 290 mg KOH/g. Viscosity 250 cps at 25° C. |
| Polyether I | An ethoxylated polyether polyol based on glycerol as initiator. OHV 165 mg KOH/g. Viscosity 275 cps at 25° C. |
| Polyether J | A propoxylated polyether polyol based on glycerol. OHV 165 mg KOH/g. Viscosity 275 cps at 25° C. |
| Polyether K | An ethoxylated polyether polyol with propylene oxide tip based on glycerol as initiator. A propylene oxide tip (1.0 mole PO/active H) has been added to the polyether after the ethoxylation was completed. EO/PO molar ratio 5.7; OHV 165 mg KOH/g. Viscosity 275 cps at 25° C. |
| Polyether L | A propoxylated polyether polyol based on polymeric diaminodiphenylmethane as initiator. OHV 165 mg KOH/g. Viscosity 5650 cps at 25° C. |
| Polyether M | A propoxylated polyether polyol based on polymeric diaminodiphenylmethane as initiator and DEG as co-initiator. OHV 310 mg KOH/g. Viscosity 1925 cps at 25° C. |
| Polyester A | A recycled PET polyester polyol with an OHV of 240 mg KOH/g and a viscosity of 4000 cps at 25° C. |
| Suprasec 2085 | Polymeric MDI with a viscosity of 650 cps at 25° C. available from Huntsman |
| Jeffcat PMDETA | pentamethylenediethylenetriamine catalyst |
| Catalyst LB | potassium acetate catalyst (48 wt % in a carrier) |
| Jeffcat DMCHA | dimethylcyclohexylamine catalyst |
| TCPP | tris(2-chloroethyl)phosphate fire retardant |
| TEP | triethylphosphate fire retardant |
| Surfactant | Silicone surfactant |
| NIAX K-zero 3000 | potassium octoate catalyst |
| Jeffcat TR 90 | 1.3.5-Tris-(3-dimethylaminopropyl-)hexahydro-s-triazine catalyst |
| Jeffsol PC | Propylene carbonate available from Huntsman |

EXAMPLE 1

Rigid polyurethane foams were prepared from the ingredients listed below in Table 1 (amounts are indicated in pbw) using a Cannon S10 High Pressure PU mixing machine. The apparatus is designed to perform high pressure (up to 170 bar) mixing of two liquid streams at lab scale. The polyol blend and isocyanate tanks require 2 kg of material and are kept at 23° C. All additives including pentane were added to the polyol blend by mechanical stirring prior to loading it into the polyol blend tank.

A curve of foam height versus time was recorded with an in-house designed dynamic flow tube equipment, which is commonly used in the industry. The parameter % height at string time was noted for each of the curves. The typical reactivity data (cream time, string time, free rise density) were also noted.

A mould of 40 cm×40 cm×10 cm was used to measure post-expansion after demoulding. The mould was left open at one side (40 cm×10 cm) and tilted under an angle of 6 degrees in order to simulate the conditions of overpack and flow present on an industrial laminator. Metal facings were present at the bottom and top of the mould at a temperature similar to an industrial laminator process. At a given point in time (demould time), the panel was removed from the mould and the maximum post expansion in the central 20 cm×20 cm area of the panel was measured. After 24 hours, the panel was cut to pieces to examine the occurrence of foam splits. The overall experiment was typically repeated for a number of demould times (e.g. 5 minutes, 6 minutes, etc. . . . ). Overall this demould test has proven to correlate well with an industrial laminator process.

The reaction to fire was measured by the B2 flame spread test according to standard DIN 4102.

The results are reported in Table 2.

TABLE 1

|  | Comparative 1 | Inventive 1 |
|---|---|---|
| Polyether A | 39.40 | 39.40 |
| Polyether C |  | 19.00 |
| Polyether D | 19.00 |  |
| Polyester A | 15.00 | 15.00 |
| Jeffcat PMDETA | 0.25 | 0.25 |
| Catalyst LB | 0.36 | 0.33 |
| Jeffcat DMCHA | 0.05 | 0.20 |
| TCPP | 18.85 | 18.85 |
| TEP | 5.00 | 5.00 |
| Surfactant | 2.00 | 2.00 |
| Water | 2.00 | 2.00 |
| n-pentane | 5.00 | 5.00 |
| Total polyol blend | 106.91 | 107.03 |
| Suprasec 2085 | 123.4 | 123.3 |
| Isocyanate Index | 130 | 130 |

TABLE 2

|  |  | Comparative 1 | Inventive 1 |
|---|---|---|---|
| Reactivity test with Cannon S10 |  |  |  |
| Cream time | s | 7 | 6 |
| String time | s | 52 | 50 |
| Free rise density | g/L | 36.1 | 35.6 |
| Dynamic flow tube test with Cannon S10 |  |  |  |
| Foam height at string time | % | 70 | 78 |
| Demould test with Cannon S10 |  |  |  |
| Post-expansion after 4 min | mm | 7.3 | 6.4 |
| Post-expansion after 5 min | mm | 6.1 | 5.3 |
| Post-expansion after 6 min | mm | 5.5 | 4.6 |
| Presence of foam splits after 6 min demoulding | yes/no | yes | no |
| DIN 4102 result (average) | cm | 14.0 | 14.5 |
| DIN 4102 classification | B2/B3 | B2 | B2 |

EXAMPLE 2

Foams were prepared from the ingredients listed in Table 3 and tested in the same way as in Example 1 above. The results are listed in Table 4.

TABLE 3

|  | Comparative 2 | Comparative 3 | Inventive 2 | Inventive 3 |
|---|---|---|---|---|
| Polyether B | 33.00 | 33.00 | 33.00 | 33.00 |
| Polyether E | 25.00 |  |  |  |
| Polyether F |  | 25.00 |  |  |
| Polyether G |  |  | 25.00 |  |
| Polyether H |  |  |  | 25.00 |
| Polyester A | 15.00 | 15.00 | 15.00 | 15.00 |
| Jeffcat PMDETA | 0.25 | 0.25 | 0.25 | 0.25 |
| Catalyst LB | 0.50 | 0.50 | 0.50 | 0.50 |
| Jeffcat DMCHA | 0.05 | 0.25 | 0.10 | 0.15 |
| TCPP | 19.00 | 19.00 | 19.00 | 19.00 |
| TEP | 5.00 | 5.00 | 5.00 | 5.00 |
| Surfactant | 2.00 | 2.00 | 2.00 | 2.00 |
| Water | 2.20 | 2.20 | 2.20 | 2.20 |
| n-pentane | 4.00 | 4.00 | 4.00 | 4.00 |
| Total polyol blend | 106.00 | 106.20 | 106.05 | 106.10 |
| Suprasec 2085 | 124.3 | 124.2 | 124.0 | 123.8 |
| Isocyanate Index | 130 | 130 | 130 | 130 |

TABLE 4

|  |  | Comparative 2 | Comparative 3 | Inventive 2 | Inventive 3 |
|---|---|---|---|---|---|
| Reactivity test |  |  |  |  |  |
| Cream time | s | 8 | 6 | 8 | 6 |
| String time | s | 46 | 51 | 48 | 50 |
| Free rise density | g/L | 36.0 | 36.8 | 35.8 | 36.8 |
| Dynamic flow tube test |  |  |  |  |  |
| Foam height at string time | % | 70 | 77 | 74 | 76 |
| Demould test |  |  |  |  |  |
| Post-expansion after 5 min | mm | 6.4 | 4.2 | 5.4 | 4.8 |
| Post-expansion after 6 min | mm | 5.5 | 3.4 | 4.7 | 4.1 |
| Presence of foam splits after 6 min demoulding | yes/no | yes | no | no | no |
| DIN 4102 result (average) | cm | 13.0 | 17.0 | 14.0 | 14.5 |
| DIN 4102 classification | B2/B3 | B2 | B3 | B2 | B2 |

EXAMPLE 3

Foams were prepared from the ingredients listed in Table 5 and tested in the same way as in Example 1 above. The results are listed in Table 6.

TABLE 5

|  | Comparative 4 | Comparative 5 | Inventive 5 |
|---|---|---|---|
| Polyether A | 39.40 | 39.40 | 39.40 |
| Polyether I | 19.00 | | |
| Polyether J | | 19.00 | |
| Polyether K | | | 19.00 |
| Polyester A | 15.00 | 15.00 | 15.00 |
| Jeffcat PMDETA | 0.25 | 0.25 | 0.25 |
| Catalyst LB | 0.50 | 0.50 | 0.50 |
| Jeffcat DMCHA | 0.05 | 0.30 | 0.15 |
| TCPP | 18.85 | 18.85 | 18.85 |
| TEP | 5.00 | 5.00 | 5.00 |
| Silicone surfactant | 2.00 | 2.00 | 2.00 |
| Water | 2.00 | 2.00 | 2.00 |
| n-pentane | 5.00 | 5.00 | 5.00 |
| Total polyol blend | 107.05 | 107.30 | 107.15 |
| Suprasec 2085 | 123.8 | 123.8 | 123.8 |
| Isocyanate Index | 130 | 130 | 130 |

TABLE 6

|  |  | Comparative 4 | Comparative 5 | Inventive 5 |
|---|---|---|---|---|
| Reactivity test | | | | |
| Cream time | s | 9 | 6 | 8 |
| String time | s | 51 | 47 | 50 |
| Free rise density | g/L | 34.6 | 35.5 | 35.1 |
| Dynamic flow tube test | | | | |
| Foam height at string time | % | 72 | 76 | 76 |
| Demould test | | | | |
| Post-expansion after 6 min | mm | 6.2 | 4.4 | 4.7 |
| Post-expansion after 7 min | mm | 5.1 | 4.0 | 4.2 |
| Presence of foam splits after 7 min demoulding | yes/no | yes | no | no |
| DIN 4102 result (average) | cm | 13.5 | 19.0 | 13.5 |
| DIN 4102 classification | | B2/B3 | B2 | B2 |

EXAMPLE 4

Rigid urethane-modified polyisocyanurate foams were prepared from the ingredients listed in Table 7 and tested in the same way as in Example 1 above. The amount of catalyst was adjusted so as to keep the string time in all samples the same. The results are listed in Table 8.

TABLE 7

|  | Comparative 6 | Comparative 7 | Inventive 6 |
|---|---|---|---|
| Polyether C | | | 60.00 |
| Polyether D | 60.00 | | |
| Polyether L | | 60.00 | |
| Polyether M | 15.00 | 15.00 | 15.00 |
| Jeffcat TR 90 | 0.05 | 1.10 | 0.60 |
| NIAX Kzero 3000 | 1.30 | 1.30 | 1.30 |
| Catalyst LB | 0.40 | 0.40 | 0.40 |
| Lactic Acid (90 wt % in water) | 1.20 | 1.20 | 1.20 |
| TCPP | 6.50 | 6.50 | 6.50 |
| TEP | 9.50 | 9.50 | 9.50 |
| Jeffsol PC | 3.00 | 3.00 | 3.00 |
| Silicone surfactant | 3.10 | 3.10 | 3.10 |
| Water | 0.60 | 0.60 | 0.60 |
| n-pentane | 11.50 | 11.50 | 11.50 |
| Total polyol blend | 112.15 | 113.20 | 112.70 |
| Suprasec 2085 | 175 | 175 | 175 |
| Isocyanate Index | 330 | 330 | 330 |

TABLE 8

|  |  | Comparative 6 | Comparative 7 | Inventive 6 |
|---|---|---|---|---|
| Reactivity test | | | | |
| Cream time | s | 5 | 3 | 4 |
| String time | s | 47 | 46 | 48 |
| Free rise density | g/L | 34.2 | 34.5 | 34.6 |
| Panel Density | | | | |
| Density 40 × 40 × 10 cm panels (average) | g/L | 43.8 | 41.1 | 40.6 |
| Demould test | | | | |
| Post-expansion after 3 min | mm | 4.3 | 5.3 | 3.6 |
| Post-expansion after 4 min | mm | 3.8 | 3.8 | 2.5 |
| Presence of foam splits after 3 min demoulding | yes/no | yes | no | no |
| DIN 4102 result (average) | cm | 9.5 | 15.3 | 11.3 |
| DIN 4102 classification | | B2/B3 | B2 | B2 |

In the examples above it can each time be seen that the comparative examples with ethoxylated polyols are able to pass the DIN 4102 test but have a number of processing weaknesses such as low height at string time, high post expansion in the demould test and the occurrence of foam splits at critical demould times. The other comparative examples with propoxylated polyethers do not have these processing limitations seen with ethoxylated polyethers but they fail to pass the DIN4102 test.

It is seen in all 4 examples that the use of ethoxylated polyethers with a propylene oxide tip according to the invention have processing characteristics very close to propoxylated polyethers (low post expansion, high height at string time, no foam splits at demoulding) but surprisingly, they still pass the DIN4102 test in all of the above examples.

On the basis of state of the art literature, this result was not to be expected since the urethane bond formed with a propylene oxide tip is generally thought to be weak in a test such as DIN4102. The Handbook 'Chemistry and Technology of Polyols for Polyurethanes' (Dr. Mihail Ionescu) says on page 547 that 'Polyurethanes based on oligo-polyols with primary hydroxyl groups are more thermostable than the polyurethanes derived from polyols with secondary groups'.

The invention claimed is:

1. A process for preparing rigid polyurethane or urethane-modified polyisocyanurate foams comprising reacting polyisocyanates and polyfunctional isocyanate-reactive compounds in the presence of blowing agents wherein the polyfunctional isocyanate-reactive compounds comprise a polyether polyol having a hydroxyl number of between 50 and 650 mg KOH/g obtained by reacting a polyfunctional initiator first with ethylene oxide and subsequently with propylene oxide such that the propoxylation degree of said polyether polyol is between 0.33 and 2 moles propylene oxide per active hydrogen atom in the polyfunctional initiator and the molar amount of ethylene oxide is from 2 to 15 moles per active hydrogen in the polyfunctional initiator; and wherein the molar ratio of ethylene oxide to propylene oxide in said polyether polyol is at least 2.

2. The process for preparing rigid polyurethane or urethane-modified polyisocyanurate foams according to claim 1, wherein the propoxylation degree of said polyether polyol is between 0.66 and 1 mole of propylene oxide per active hydrogen atom in the initiator.

3. The process for preparing rigid polyurethane or urethane-modified polyisocyanurate foams according to claim 1, wherein the molar ratio of ethylene oxide to propylene oxide is between 2 and 10.

4. The process for preparing rigid polyurethane or urethane-modified polyisocyanurate foams according to claim 1, wherein the hydroxyl number of said polyether polyol is between 50 and 400 mg KOH/g.

5. The process for preparing rigid polyurethane or urethane-modified polyisocyanurate foams according to claim 1, wherein the polyfunctional initiator used to obtain said polyether polyol is selected from glycerol, diaminodiphenylmethane and polymethylene polyphenylene polyamines.

6. The process for preparing rigid polyurethane or urethane-modified polyisocyanurate foams according to claim 1, wherein said polyether polyol is present in an amount ranging from 5 to 80 pbw per 100 parts by weight of the polyfunctional isocyanate-reactive compounds.

7. The process for preparing rigid polyurethane or urethane-modified polyisocyanurate foams according to claim 1, wherein the blowing agents are selected from the group consisting of hydrocarbons, hydrofluorocarbons, hydrochlorofluoroolefins, hydrofluoroolefins and any mixture thereof.

8. The process for preparing rigid polyurethane or urethane-modified polyisocyanurate foams according to claim 1, wherein the reacting is carried out at an isocyanate index of up to 240% in order to prepare rigid polyurethane foam.

9. The process for preparing rigid polyurethane or urethane-modified polyisocyanurate foams according to claim 1, wherein the reacting is carried out at an isocyanate index of from 250 to 1000% in order to prepare rigid urethane-modified polyisocyanurate foam.

10. The process for preparing rigid polyurethane or urethane-modified polyisocyanurate foams according to claim 1, wherein the reacting is carried out in the presence of flame retardants in an amount of 10 to 60 pbw per 100 parts by weight of the polyfunctional isocyanate-reactive compounds.

11. A rigid polyurethane or urethane-modified polyisocyanurate foam obtained by the process for preparing rigid polyurethane or urethane-modified polyisocyanurate foams as defined in claim 1.

12. The rigid polyurethane or urethane-modified foam according to claim 11 wherein said rigid polyurethane or urethane-modified polyisocyanurate foam satisfies the requirements of fire class B2 according to DIN 4102 test.

13. The rigid polyurethane or urethane-modified foam as defined in claim 11 wherein said rigid polyurethane or urethane-modified polyisocyanurate foam is a layer in a sandwich panel.

14. The process for preparing rigid polyurethane or urethane-modified polyisocyanurate foams according to claim 1, where the amount of ethylene oxide is 2.5 to 8.5 moles per active hydrogen atom in the polyfunctional initiator.

* * * * *